Nov. 15, 1927.
W. W. LEWIS
1,649,241
LIQUID SAMPLING DEVICE
Filed July 7, 1926
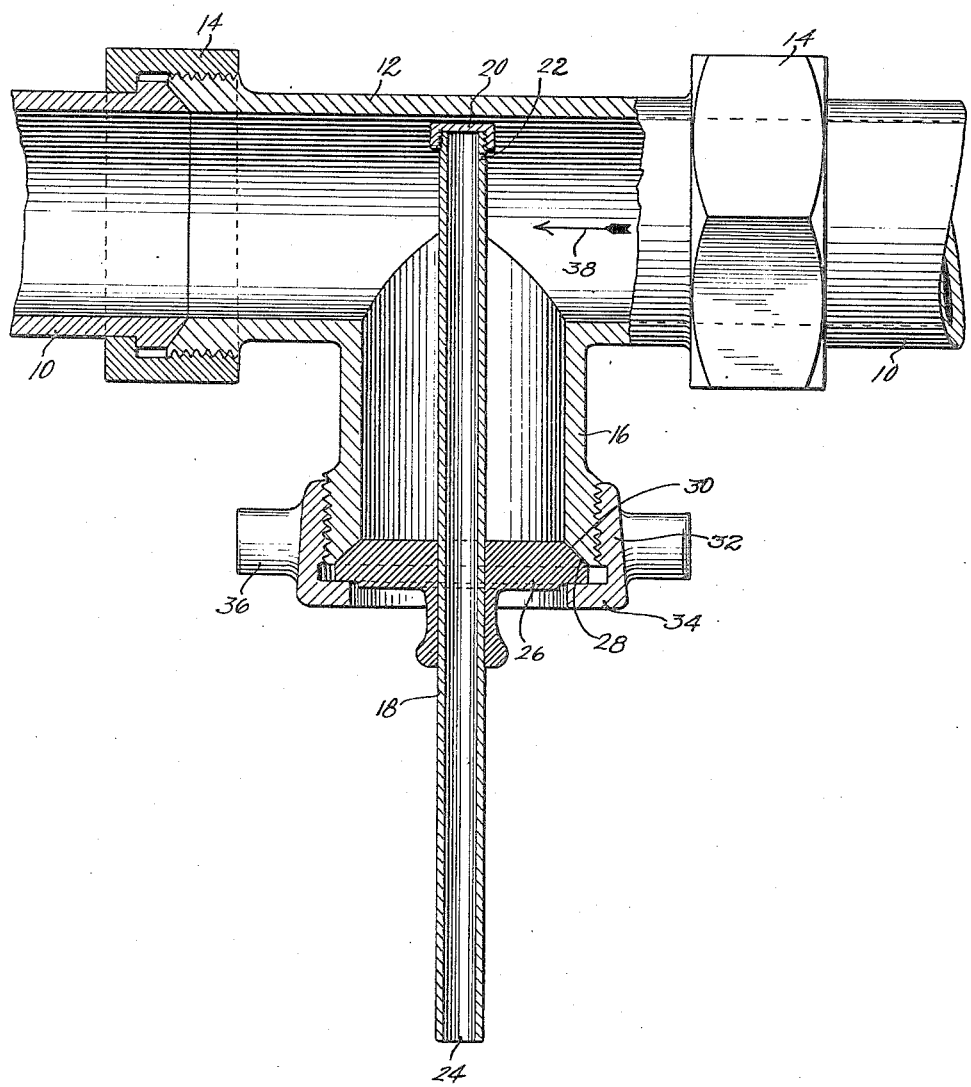
INVENTOR
WILLIAM W. LEWIS
BY
ATTORNEYS Patented Nov. 15, 1927.

1,649,241

UNITED STATES PATENT OFFICE.

WILLIAM W. LEWIS, OF NEW MILFORD, PENNSYLVANIA, ASSIGNOR TO DAIRYMEN'S LEAGUE CO-OPERATIVE ASSOCIATION, INC., OF NEW YORK, N. Y., A CORPORATION OF NEW YORK.

LIQUID-SAMPLING DEVICE.

Application filed July 7, 1926. Serial No. 120,964.

This invention relates to the handling or treating of milk and other liquids and has for its general object the provision of means for facilitating the obtaining of test samples of the milk or other liquid in such manner as to determine more accurately than heretofore the average character of the liquid being handled or treated.

In plants for Pasteurizing, bottling or otherwise handling or treating milk, in which large quantities of milk must be handled, it is customary to pass the milk under pressure through a system of piping by means of which the milk is transferred from one point to another in the plant, the pressure being usually supplied by means of a pump. It is important to know the condition and character of the milk that is passing through the piping system and that is to be bottled or to undergo treatment and to this end it has been customary heretofore to provide one or more pet cocks, at a convenient point or points in the path of travel of the milk, through which from time to time samples of the milk may be drawn off.

Such periodical drawing off of samples of milk does not, however, necessarily give the average character of the milk that is passing through the system, since milk of various conditions and having various characteristics may pass through the system between the successive openings of the pet cock or pet cocks to obtain samples. Moreover, the manual operation of these pet cocks requires considerable attention on the part of the attendant of the machine.

One of the objects of the present invention is to insure the obtaining of samples of milk which are true averages of the milk that has been flowing through the piping system. A further object of the invention is not only to secure a true average sample, but to obtain this automatically and without attention on the part of the sampler or other attendant of the milk handling machinery.

Other objects and important features of the invention will appear from the following description and claims when considered in connection with the accompanying drawing which shows partly in elevation and partly in section a feed line of a milk treating plant to which the present invention has been applied.

In the illustrated embodiment of the invention the feed line or conduit 10 has located therein at a convenient point a T coupling 12 which has its straight portion connected to the adjacent parts of the feed line by any suitable connection, such as the pipe unions 14, it being important that the T coupling and its associated parts be so constructed and arranged as to permit convenient cleaning. The T coupling 12 is preferably inserted in the feed line or conduit 10 in such manner that the stem portion 16 thereof depends from the feed line, preferably in a substantially vertical position. Extending up through the stem portion 16 of the T into the horizontal portion thereof, and preferably to a point near the top of the stream of milk flowing through the feed line or conduit 10, is a sampling tube 18 of a special construction now to be described. This sampling tube 18 is provided with a cap 20 screwed upon the upper end thereof and readily removable for convenience in cleaning the inside of the tube and it is also provided near its upper end with a small leak hole 22 through which milk flowing through the conduit or feed line 10 may leak into the interior of the tube 18 and flow down through its open lower end 24 into any suitable receptacle in which the average sample is to be collected for test purposes. The hole 22 is preferably comparatively small, being in a practical application of the invention to a 2-inch feed line about the size of a #59 wire gauge. It will be understood, of course, that variations may be made in the size of this opening 22 without departing from the invention.

In the illustrated embodiment of the invention, the sampling tube 18 is held in a closure 26 of valve-like construction, having a bevelled seat-engaging face 28 arranged to engage a corresponding seat 30 of the stem 16, a threaded collar 32 having a flange 34 arranged to engage the underface of the closure 26 serving to force the bevelled face 28 into fluid-tight engagement with the seat 30, these abutting parts being preferably ground to secure a fluid-tight joint. For convenience in removing the sampling tube and its associated parts from the feed line for cleaning, the collar 32 may be provided with handles or finger engaging projections 36.

From the foregoing description of the illustrated embodiment of the invention, the operation of obtaining an average sample will be obvious. It will be understood that when the milk or other liquid to be sampled is being forced under pressure through the feed line or conduit 10, this line will be substantially full of milk so long as the pressure is applied. In order that the average sample may be obtained automatically while the milk is being forced through the line and in order that no sample be taken while the milk is not being forced through the line, the opening or leak 22 into the sampling tube 18 is preferably located near the upper part of the inside of the conduit or feed line 10 so that only when the conduit 10 is substantially full, that is when milk or other liquid to be sampled is being forced under pressure through the feed line, will a portion of the liquid leak through the opening 22 into the sampling tube 18.

As this leaking of a relatively small portion of the liquid into the sampling tube 18 is continuous, the sample obtained will show an average of both the condition and the character of the milk or other liquid flowing through the pipe line and this average will not be disturbed by leakage of the milk into the sampling tube when milk is not flowing through the line under pressure. In other words, the sample taken is a true average of what is being pumped through the line and is automatically taken only when the milk or other liquid to be sampled is being pumped through the line. Further to insure the accuracy of the average and the uniformity of the leaking action, the opening 22 preferably faces the stream of milk. In other words, the direction of flow of the milk tends to carry it into the opening 22 as shown by the arrow 38.

It is to be understod that the term "pressure" as used in the specification and claims is not restricted to a flow inducing pressure head put upon the milk or other liquid by means of a pump but includes any flow inducing head however produced.

What is claimed as new is:

1. A device for obtaining an average sample of milk or other perishable liquid flowing through a conduit having a substantially horizontal portion, which comprises a tube, of a diameter permitting its convenient cleansing, extending upwardly into the liquid stream in the substantially horizontal portion of the conduit, said tube having at a predetermined height from the bottom of said conduit a leak opening thereinto of relatively small diameter into which successive samples of the milk or other perishable liquid flowing through said conduit may leak when the stream depth is equal to or greater than the height of said opening.

2. Means for obtaining an average sample of milk or other perishable liquid as it is pumped through a piping system having a substantially horizontal portion, which comprises a tube, of a diameter to permit its convenient cleansing, extending from outside the system upwardly into the liquid stream in the substantially horizontal portion of said piping system, said tube having a leak opening thereinto of relatively small diameter and located at a predetermined height from the bottom of the stream, through which opening successive samples of the milk or other perishable liquid may leak into said tube only when the liquid stream is of a depth equal to or greater than the height of the opening.

3. A device for obtaining an average sample of a perishable liquid intermittently flowing through a conduit having a substantially horizontal portion, which comprises a tube, of a diameter permitting its ready cleansing, extending up into the stream of liquid in the substantially horizontal portion of the conduit, said tube having at the desired height in said stream a leak opening thereinto of relatively small diameter into which successive samples of the flowing liquid may leak when the depth of the stream is at least equal to the height of said opening, said opening being opposed to the direction of flow of the stream.

4. A device for obtaining an average sample of milk or other perishable liquid that is intermittently pumped through a conduit having a substantially horizontal portion, which comprises a tube, of a diameter to permit its convenient cleansing, extending up into the substantially horizontal portion of the conduit, a removable cap closing the end of the tube within the conduit, said tube having a leak opening thereinto of relatively small diameter and located at such a height from the bottom of the conduit that the milk or other perishable liquid will only leak thereinto when a stream of predetermined depth flows through said conduit.

5. A device for obtaining an average sample of milk or other perishable liquid which is intermittently pumped through a conduit having a substantially horizontal portion, which comprises a removable tube extending from outside the conduit into the substantially horizontal portion of the conduit, a removable cap closing the end of the tube within the conduit and permitting, by its removability, ready cleansing of the tube, said tube having a leak opening extending thereinto of relatively small diameter into which successive samples of the liquid may leak and be conducted outside said conduit, said opening being located at such a height above the bottom of the conduit as to be within the stream depth only when the liquid is being pumped therethrough.

6. A sampling device for obtaining an average sample of liquid being forced under pressure through a pipe, comprising a T-coupling inserted in said pipe and having a depending stem, a tube extending through the stem of said coupling to near the upper part of the liquid passage in said pipe and having near its upper end a leak opening through which a portion of the flowing stream can enter the interior of said tube, and means for removably retaining said tube in sample taking relation to the T-coupling.

7. A device of the character described comprising a T-coupling, a valve-like member for closing the open end of the stem of said T-coupling, means for seating and securing said valve-like member to close the open end of the stem of said T-coupling, a tube carried by said valve-like member and extending through the stem portion of the coupling, a removable cap for closing the inner end of said tube, said tube having an opening therein adjacent to the inner end thereof.

8. A device of the character described comprising a T-coupling adapted for interposition in a pipe line through which a liquid is passed under pressure, means for closing the open end of the stem of the T-coupling, a tube carried by said closing means and projecting through the stem of the T-coupling into close proximity to the side wall of the body of the T-coupling at a point diametrically opposed with respect to the stem-portion of the T-coupling, a cap closing the inner end of said tube, said cap being removable with respect thereto, there being a relatively small opening formed in the side of said tube adjacent the inner end thereof, said tube being so positioned that the opening in the inner end thereof will face the stream of liquid in its flow through the pipe line in which the T-coupling is placed.

Signed at New York, New York, this 30 day of June, 1926.

WILLIAM W. LEWIS.